United States Patent       (10) Patent No.: US 11,570,950 B2
Windsor et al.                 (45) Date of Patent:      Feb. 7, 2023

(54) FOLDING HARVESTER WITH CROP DIVIDER LIFT AND FRAME LOCK

(71) Applicant: DEERE & COMPANY, Moline, IL (US)

(72) Inventors: Eric D. Windsor, Geneseo, IL (US); Nathan E. Krehbiel, Bettendorf, IA (US); Dennis P. Silver, Ankeny, IA (US); Andrew J. Braet, East Moline, IL (US); Todd M. Verhoef, Coal Valley, IL (US)

(73) Assignee: Deere & Company, Moline, IL (US)

( * ) Notice: Subject to any disclaimer, the term of this patent is extended or adjusted under 35 U.S.C. 154(b) by 402 days.

(21) Appl. No.: 16/932,541

(22) Filed: Jul. 17, 2020

(65) Prior Publication Data

US 2022/0015293 A1    Jan. 20, 2022

(51) Int. Cl.
*A01D 41/14* (2006.01)
*A01D 43/08* (2006.01)
*A01D 45/02* (2006.01)

(52) U.S. Cl.
CPC ......... *A01D 41/144* (2013.01); *A01D 43/082* (2013.01); *A01D 45/021* (2013.01)

(58) Field of Classification Search
CPC ... A01D 41/144; A01D 43/082; A01D 45/021
See application file for complete search history.

(56) References Cited

U.S. PATENT DOCUMENTS

| | | | | |
|---|---|---|---|---|
| 4,446,682 A | * | 5/1984 | Jennen ............... | A01D 45/021 56/319 |
| 4,538,404 A | * | 9/1985 | Heimark, Jr ......... | A01D 45/021 56/119 |
| 4,553,379 A | * | 11/1985 | Kalverkamp ........ | A01D 45/021 56/106 |
| 5,787,697 A | * | 8/1998 | Post ..................... | A01D 45/021 56/119 |
| 5,865,019 A | * | 2/1999 | Hurlburt .............. | A01D 45/021 56/118 |
| 5,910,092 A | * | 6/1999 | Bennett ................ | A01D 45/021 56/119 |

(Continued)

FOREIGN PATENT DOCUMENTS

EP    2695509 A1 *  2/2014   .......... A01D 41/144
EP    3090619 B1 * 10/2019   .......... A01D 45/021

*Primary Examiner* — Arpad F Kovacs
(74) *Attorney, Agent, or Firm* — Michael Best & Friedrich LLP (57) ABSTRACT

A crop head for a harvester includes a folding frame having a first frame portion and a second frame portion configured to be folded in a transport state and unfolded in a harvesting state. The first and second frame portions are lockable with respect to each other to inhibit folding and unlockable with respect to each other to allow folding. A plurality of crop dividers is supported by the first frame portion. The plurality of crop dividers includes at least one movable crop divider that is movable with respect to the first frame portion. The crop head also includes a cylinder and a piston movable with respect to the cylinder. The piston is operable to move the movable crop divider between the first and second positions and is configured to directly engage the first and second frame portions to lock the first and second frame portions with respect to each other.

20 Claims, 9 Drawing Sheets

(56) References Cited

U.S. PATENT DOCUMENTS

| | | | | |
|---|---|---|---|---|
| 6,247,297 B1 * | 6/2001 | Becker | ............... | A01D 45/021 56/119 |
| 6,513,313 B1 * | 2/2003 | Bennett | ............... | A01D 45/021 56/319 |
| 7,162,855 B2 * | 1/2007 | Boeckmann | ......... | A01D 45/021 56/15.2 |
| 7,681,387 B2 * | 3/2010 | Guldenpfennig | .... | A01D 45/021 56/119 |
| 8,141,331 B2 * | 3/2012 | Bich | ................ | A01D 63/04 56/15.8 |
| 8,387,352 B2 * | 3/2013 | Silver | ............... | A01D 45/021 56/319 |
| 8,640,434 B2 * | 2/2014 | Lohrentz | ............. | A01D 45/021 56/119 |
| 9,072,222 B2 * | 7/2015 | Bomleny | ............ | A01D 41/144 |
| 10,433,482 B2 | 10/2019 | Lehman | | |
| 10,820,509 B2 * | 11/2020 | Schroeder | ............ | A01D 61/004 |
| 2015/0089914 A1 * | 4/2015 | Lohrentz | ............. | A01D 45/021 56/119 |
| 2021/0282320 A1 * | 9/2021 | Windsor | ............. | A01D 45/023 |

* cited by examiner

FOLDING HARVESTER WITH CROP DIVIDER LIFT AND FRAME LOCK

FIELD OF THE DISCLOSURE

The present disclosure relates to harvesters, such as corn harvesters.

BACKGROUND

A harvester may have a corn head with crop dividers. The corn head may fold from a harvesting position to a transport position.

SUMMARY

In one aspect, the disclosure provides a crop head for a harvester. The crop head includes a folding frame having at least a first frame portion and a second frame portion. The first and second frame portions are configured to be folded with respect to each other in a transport state and unfolded with respect to each other in a harvesting state. The first and second frame portions are lockable with respect to each other to inhibit folding and unlockable with respect to each other to allow folding. A plurality of crop dividers is supported by the first frame portion. The plurality of crop dividers includes at least one movable crop divider that is movable with respect to the first frame portion between a first position and a second position. The crop head also includes a cylinder and a piston movable with respect to the cylinder between an extended position and a retracted position. The piston is operable to move the movable crop divider between the first and second positions. The piston is configured to directly engage the first and second frame portions to lock the first and second frame portions with respect to each other.

In another aspect the disclosure provides a crop head for a harvester. The crop head includes a folding frame having at least a first frame portion and a second frame portion. The first and second frame portions are lockable with respect to each other to inhibit folding in a harvesting state and unlockable with respect to each other to allow folding in a transport state. The first and second frame portions are configured to be aligned in the harvesting state to define a lock having a locking axis extending through the first and second frame portions. A plurality of crop dividers is supported by the first frame portion. The plurality of crop dividers includes at least one movable crop divider that is movable with respect to the first frame portion between a first position and a second position. The crop head also includes a cylinder and a piston movable with respect to the cylinder between an extended position and a retracted position. The piston is operable to move the movable crop divider between the first and second positions. The piston is disposed coaxially with the locking axis.

In another aspect the disclosure provides a crop head for a harvester. The crop head includes a folding frame having at least a first frame portion and a second frame portion. The first and second frame portions are lockable with respect to each other to inhibit folding in a harvesting state and unlockable with respect to each other to allow folding in a transport state. The first and second frame portions are configured to be aligned in the harvesting state to define a lock having a locking axis extending through the first and second frame portions. A plurality of crop dividers is supported by the first frame portion. The plurality of crop dividers includes at least one movable crop divider that is movable with respect to the first frame portion between a first position and a second position. The crop head also includes an actuator having a piston and a cylinder. The piston is movable with respect to the cylinder between an extended position and a retracted position. The piston is operable to move the movable crop divider between the first and second positions. The piston is configured to lock and unlock the first and second frame portions with respect to each other without the use of a linkage between the piston and the lock.

Other aspects of the disclosure will become apparent by consideration of the detailed description and accompanying drawings.

DETAILED DESCRIPTION

Before any embodiments of the disclosure are explained in detail, it is to be understood that the disclosure is not limited in its application to the details of construction and the arrangement of components set forth in the following description or illustrated in the following drawings. The disclosure is capable of supporting other embodiments and of being practiced or of being carried out in various ways. The term "generally" is to be understood to encompass "approximately" (e.g., within normal manufacturing tolerances) and "exactly".

Figure 1:
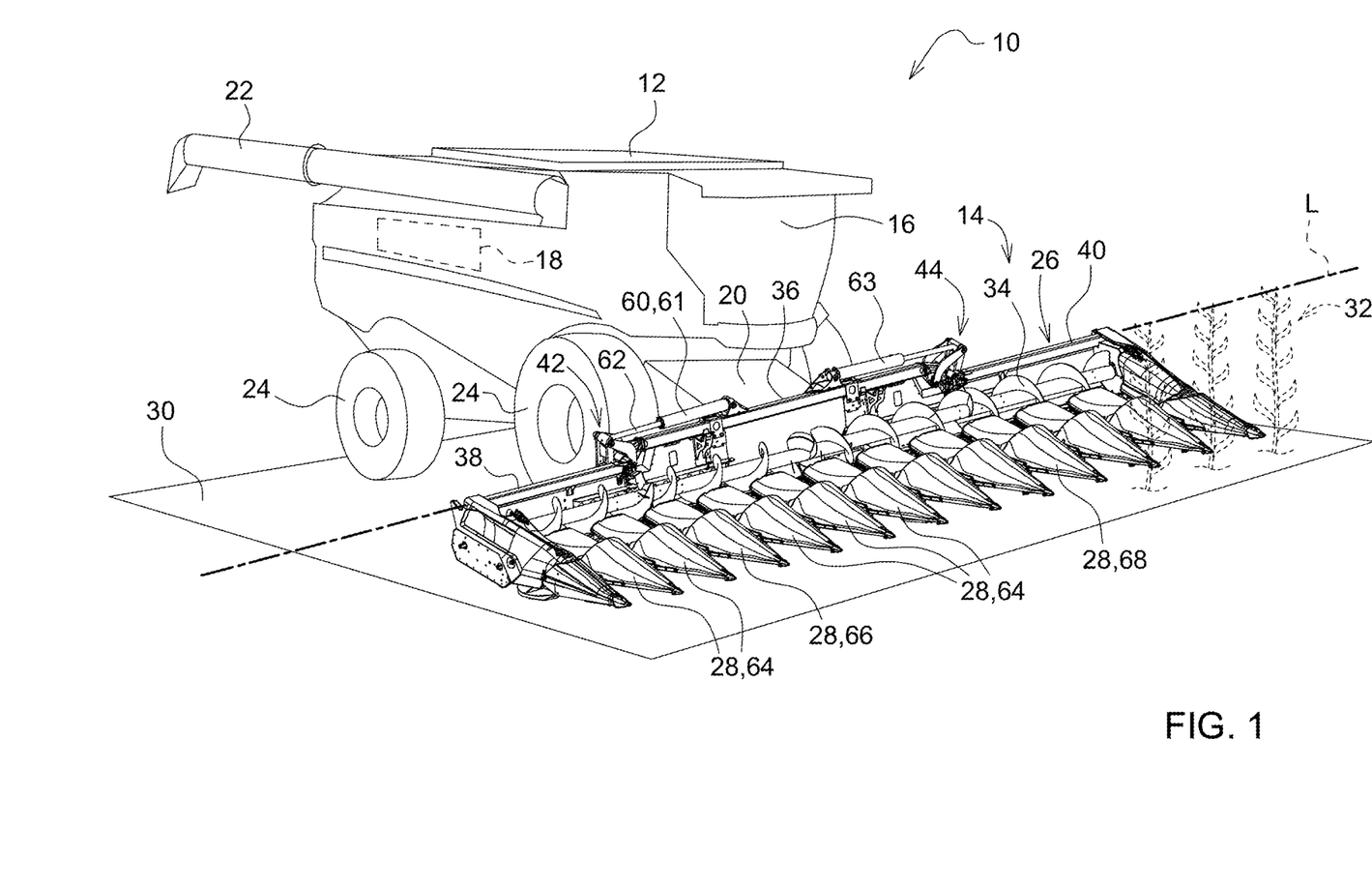
FIG. 1 is a perspective view of a corn harvester having a folding corn head in a deployed position with a locked frame according to some implementations of the present disclosure.

FIG. 1 illustrates a harvester 10, such as a corn harvester or other crop harvester, including a work vehicle 12 and a crop head 14 attachable to the work vehicle 12. The illustrated work vehicle 12 includes an operator cab 16, a prime mover 18, a hopper 20, a dispensing chute 22, and a plurality of wheels 24. The prime mover 18 is configured to move the work vehicle 12 and the crop head 14 along a support surface 30, such as the ground (e.g., in a field). The crop head 14 is configured to engage and harvest crops 32 in the field. The hopper 20 is configured to receive harvested crops 32 from the crop head 14. The dispensing chute 22 is configured to dispense the harvested crops 32 to a container (not shown), such as a wagon. In other implementations, the work vehicle 12 may include tracks in place of the plurality of wheels 24. In other implementations, the harvester 10 and crop head 14 may be configured for other crops, such as wheat or other grains.

The illustrated crop head 14 includes a frame 26 (which may also be referred to as a folding frame 26) supporting a plurality of crop dividers 28 and a cross auger 34. The crop head 14 engages the crops 32 in the field and conveys the crops 32 to the work vehicle 12. Specifically, the crop dividers 28 are configured to engage and separate the crops 32, e.g., between rows of the crops 32 to draw the crops 32 in between the crop dividers 28, and convey the crops 32 toward the cross auger 34. For example, the crops 32 may include corn. The cross auger 34 is configured to move harvested crops 32 toward the hopper 20. In other implementations, the crop dividers 28 and the cross auger 34 may be configured for other crops, such as wheat or other grains.

Figure 2:
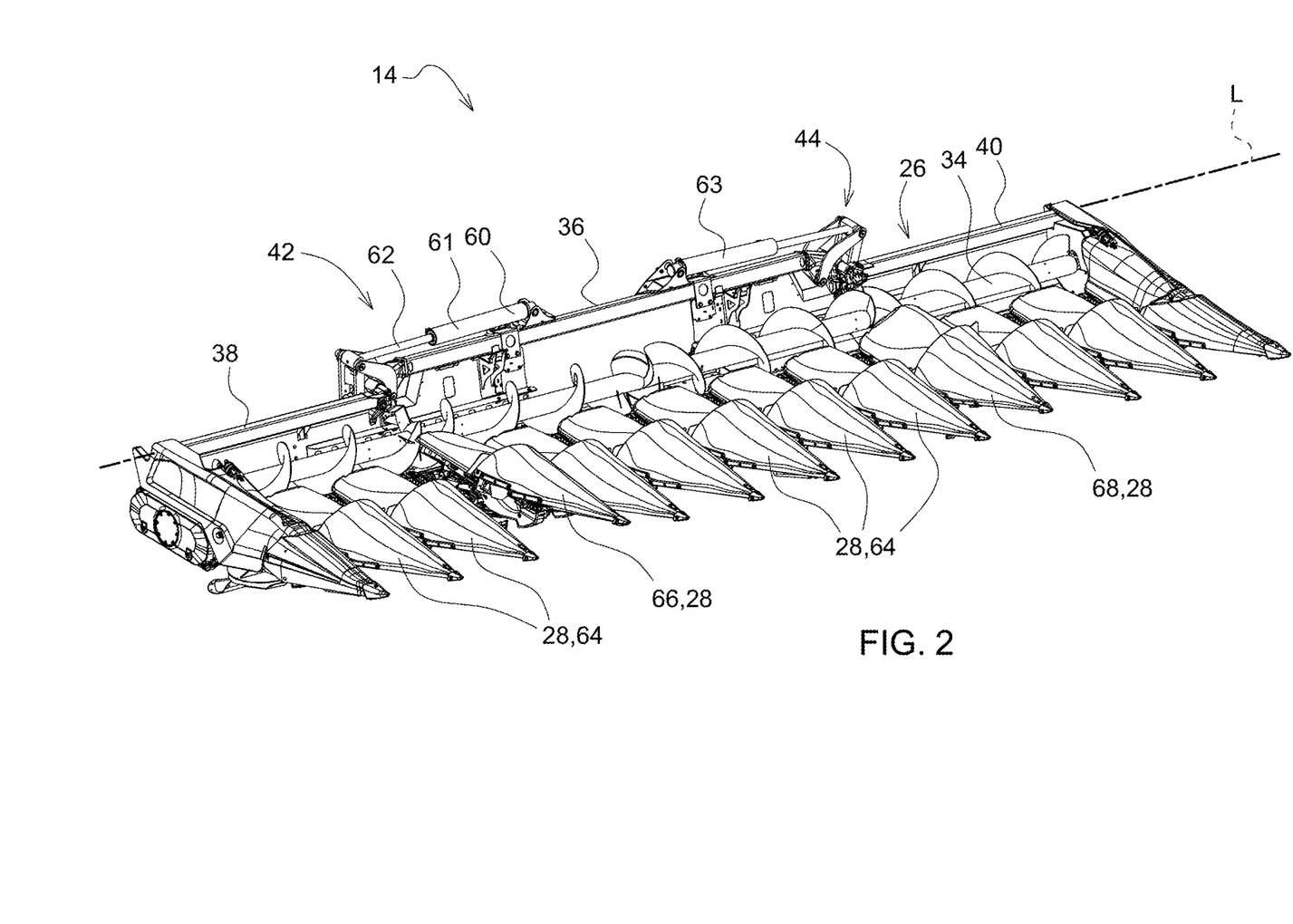
FIG. 2 is a perspective view of the folding corn head of FIG. 1 in the deployed position with an unlocked frame and two movable crop dividers in a lifted position.
Figure 3:
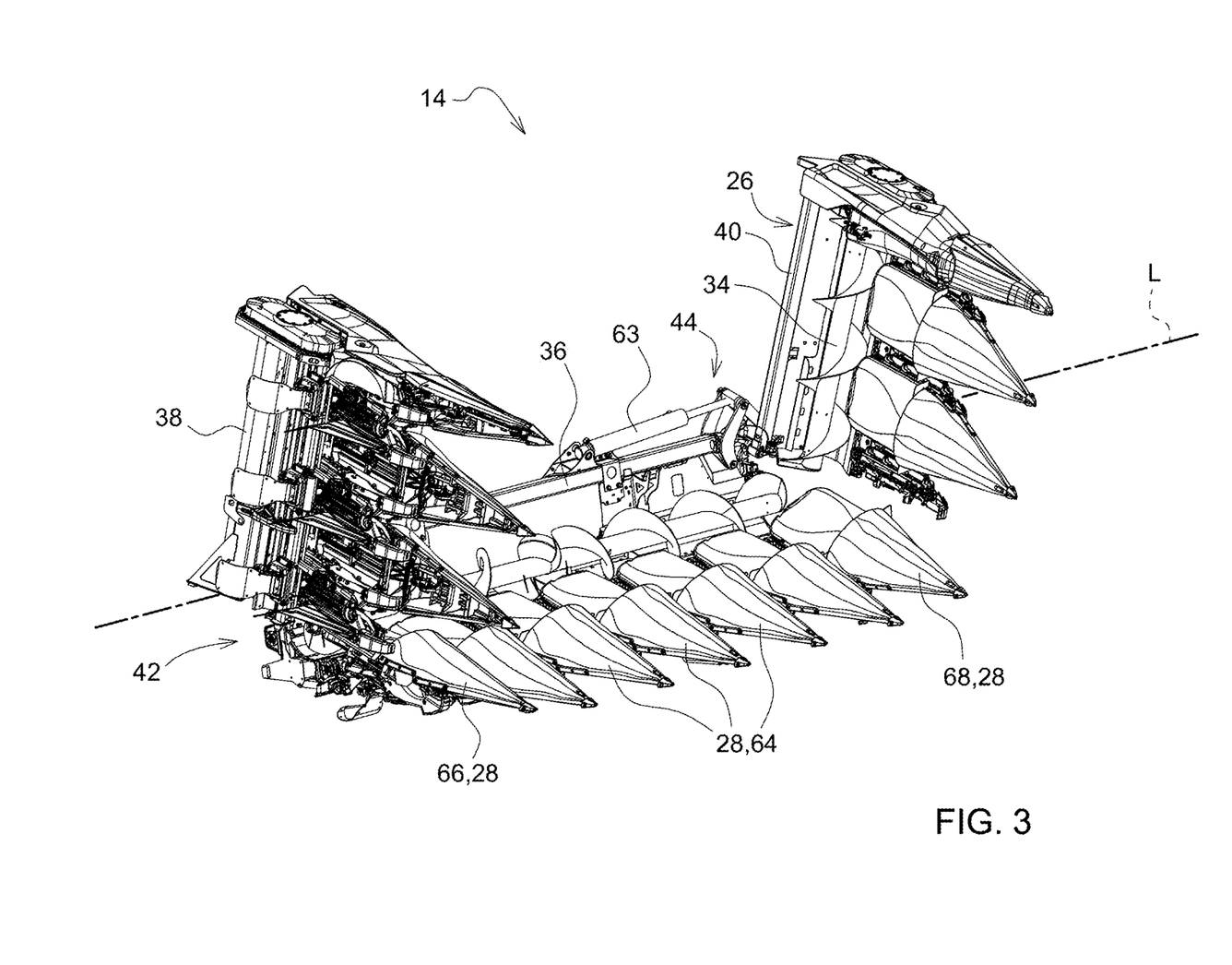
FIG. 3 is a perspective view of the folding corn head in a raised position with the two movable crop dividers in the lifted position.
Figure 4:
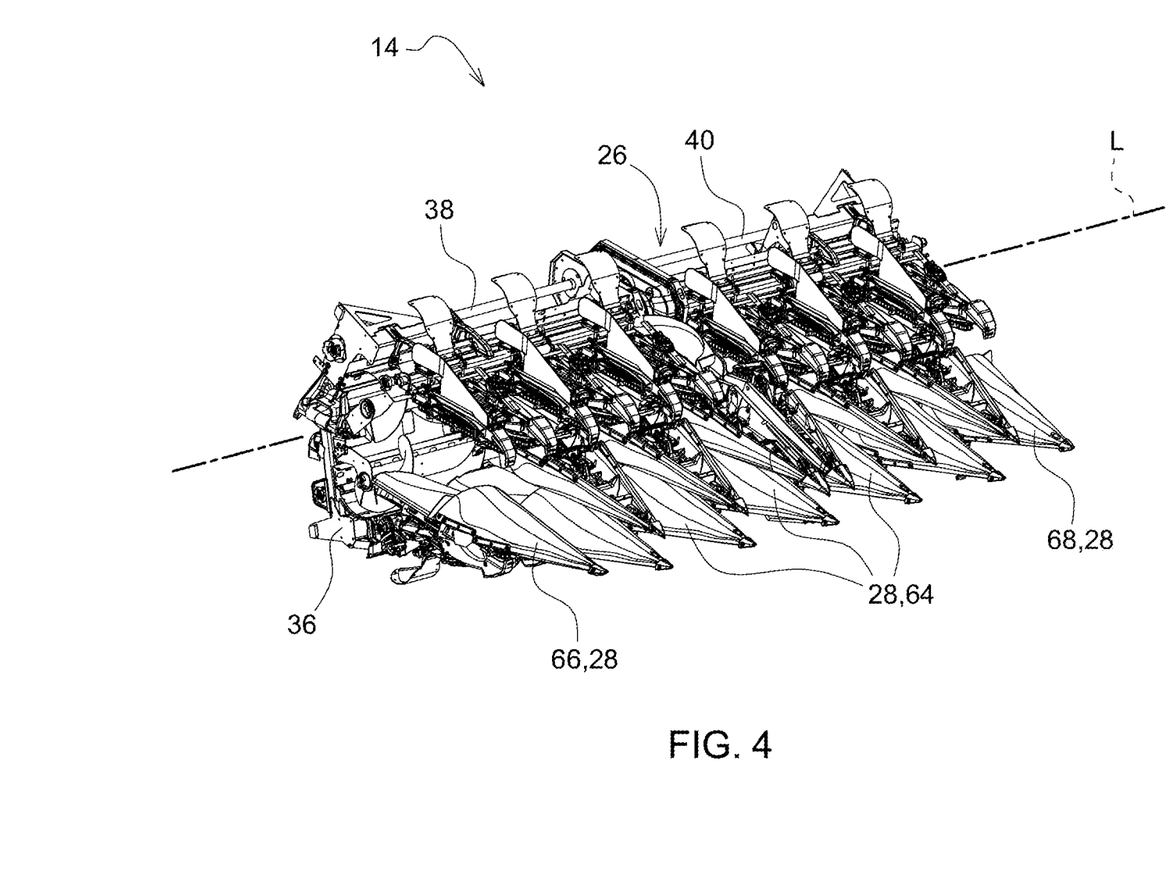
FIG. 4 is a perspective view of the folding corn head in a stowed position with the two movable crop dividers in the lifted position.

FIGS. 2-4 illustrate the frame 26 in greater detail. The frame 26 includes a first frame portion 36, a second frame portion 38, and a third frame portion 40. The first frame portion 36 is disposed centrally between the second and third frame portions 38, 40 in a longitudinal direction L. The second and third frame portions 38, 40 may be referred to as side frame portions. The second frame portion 38 is foldable with respect to the first frame portion 36, and the third frame portion 40 is foldable with respect to the first frame portion 36. Each of the first, second, and third frame portions 36, 38, 40 supports at least one of the plurality of crop dividers 28. In the illustrated implementation, each of the first, second, and third frame portions 36, 38, 40 supports more than one of the plurality of crop dividers 28. The second and third frame portions 38, 40 are configured to move (e.g., fold) with respect to the first frame portion 36 between a deployed position (FIGS. 1-2) (e.g., unfolded) for harvesting the crops 32 and a stowed position (FIG. 4) (e.g., folded) for transporting the crop head 14. FIG. 3 illustrates an intermediate position of the first, second, and third frame portions 36, 38, 40, between the deployed position and the stowed position in which the second and third frame portions 38, 40 are raised.

In the deployed position (FIGS. 1-2), the first, second, and third frame portions 36, 38, 40 are disposed generally horizontally with respect to the support surface 30 in a generally linear or sequential fashion along the longitudinal direction L such that the plurality of crop dividers 28 are arranged one after the other in a generally straight line. In the deployed position (FIGS. 1-2), the first, second, and third frame portions 36, 38, 40 are aligned with respect to each other in the longitudinal direction L and are all adjacent the support surface 30.

In the stowed position (FIG. 4), the second and third frame portions 38, 40 are folded over the top of the first frame portion 36 such that the second and third frame portions 38, 40 are stacked above the first frame portion 36. In the stowed position, only the first frame portion 36 is directly adjacent the support surface 30 while the second and third frame portions 38, 40 are stacked adjacent the first frame portion 36 such that the first frame portion 36 is disposed between the support surface 30 and the second and third frame portions 38, 40.

Directional terms such as top, above, up, high, etc., are to be understood as being defined in a direction away from the support surface 30 and terms such as bottom, below, down, low, etc. are to be understood as being defined in a direction towards the support surface 30. Terms such as horizontal and vertical are also to be understood with respect to the support surface 30.

Figure 5:
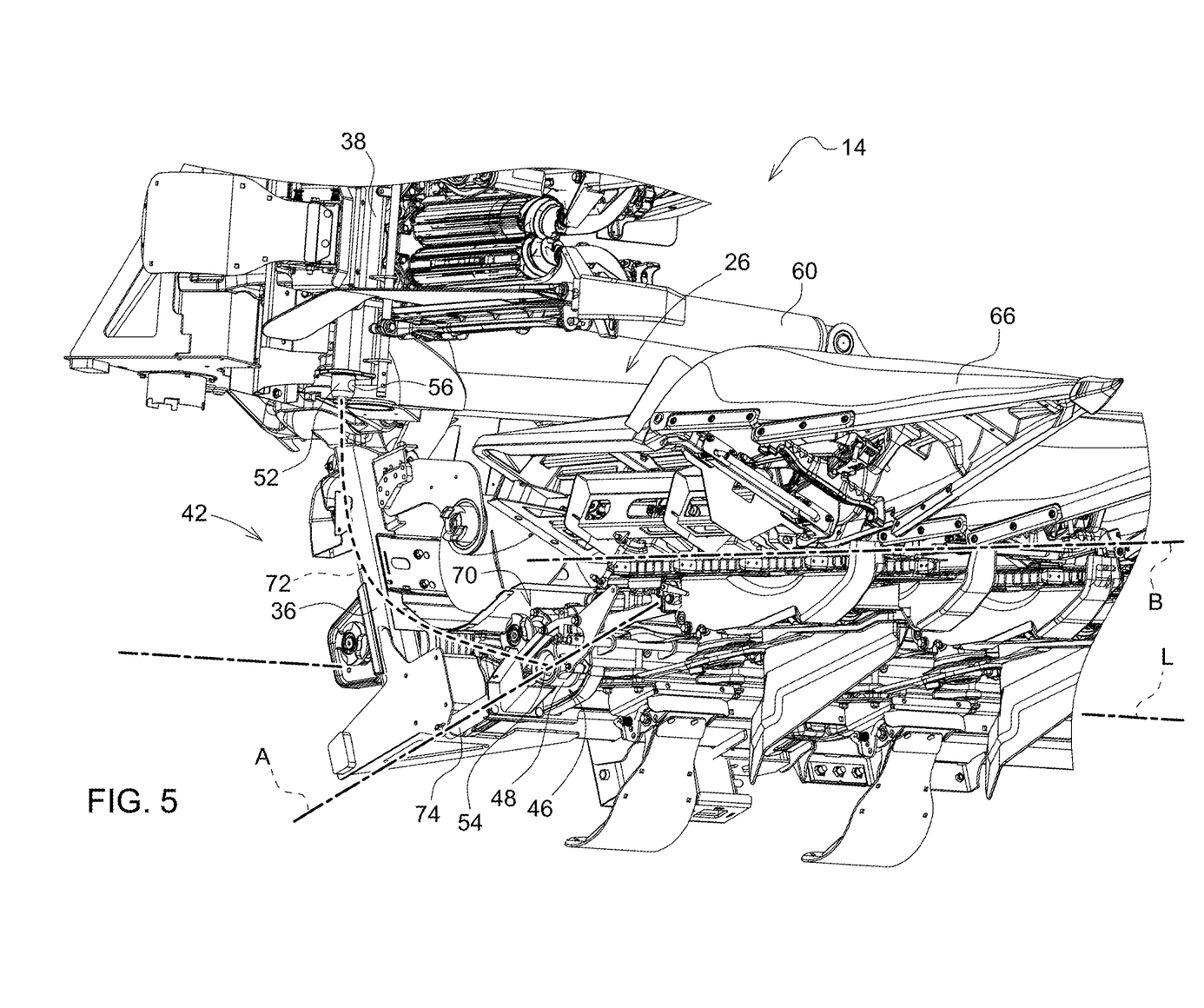
FIG. 5 is an enlarged bottom perspective view of the folding corn head in the raised position with the movable crop divider in the lifted position.
Figure 6:
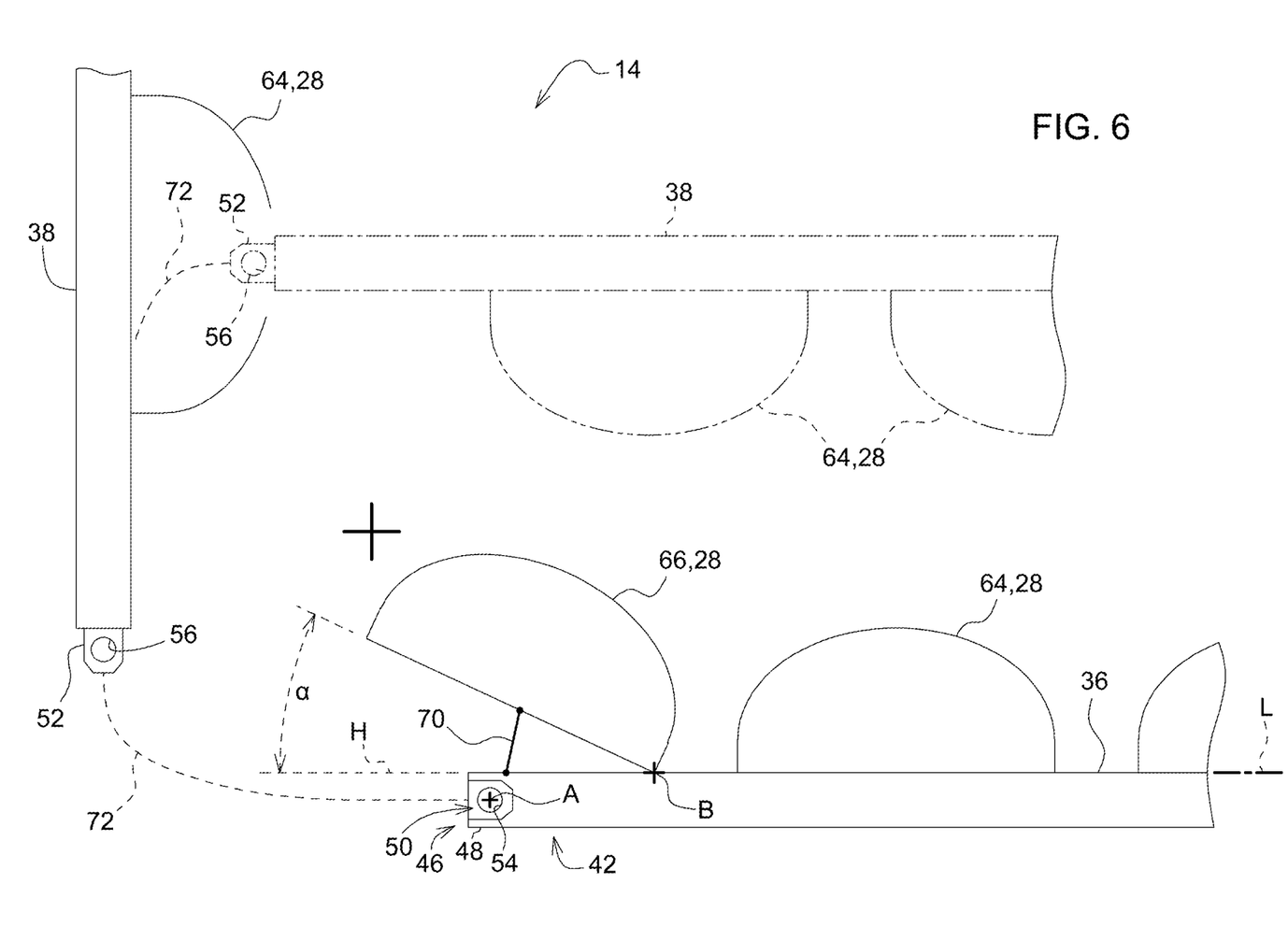
FIG. 6 is a schematic view of one side of the folding corn head in the raised position with the movable crop divider in the lifted position.

FIGS. 5-6 illustrate movement of the second frame portion 38 with respect to the first frame portion 36 in greater detail. The first and second frame portions 36, 38 are shown in the intermediate position in FIGS. 5-6. It should be understood that the third frame portion 40 operates as a mirror image to the second frame portion 38 and that all description herein of the second frame portion 38 also describes the third frame portion 40. It should also be understood that opposite first and second ends 42, 44 of the first frame portion 36 are mirror images of each other and all description herein of the first end 42 also describes the second end 44. As such, the third frame portion and the second end 44 of the first frame portion need not be described separately herein and reference is made to the description of the first and second frame portions 36, 38 herein.

The first and second frame portions 36, 38 are aligned in the deployed position. For example, the first and second frame portions 36, 38 may extend longitudinally aligned along the longitudinal axis L with respect to each other in the deployed position, or coaxially with respect to each other.

With reference to FIGS. 5-6, the first frame portion 36 includes a collar 48 at the first end 42 having a receptacle 50, and the second frame portion 38 includes a projection 52 configured to be received in the receptacle 50. In other implementations, the collar 48 and the projection 52 may be reversed. In yet other implementations, other interlocking, mating, or cooperating structures and geometries may be employed.

In the stowed position (FIG. 4) and the intermediate position (FIG. 3), the first frame portion 36 defines a lock 46 (FIGS. 5 and 7-9) having a locking axis A extending therethrough. A first aperture portion 54 extends into the collar 48 to define the lock 46 and the locking axis A, which is coaxial with the first aperture portion 54. Thus, the lock 46 is defined by the first frame portion 36 in both the stowed and the intermediate positions. In other implementations, the lock 46 may be defined by other structures. In yet other implementations, the lock 46 may be defined in the second frame portion 38, e.g., the collar 48 and projection 52 may be reversed.

A second aperture portion 56 extends into the projection 52. The first and second aperture portions 54, 56 may extend either partially into or wholly through the collar 48 and the projection 52, respectively. In the deployed position, with the projection 52 received in the collar 48 (FIGS. 1, 2, and 7-9), the first and second aperture portions 54, 56 are aligned coaxially with respect to each other to define the lock 46 with the locking axis A extending through the projection 52 and the collar 48. In the deployed position, the first and second aperture portions 54, 56 are coaxially aligned and may collectively be referred to as an aperture 58. As such, the locking axis A passes through both the first and second frame portions 36, 38 in the deployed position.

In the intermediate and stowed positions (FIGS. 3-4 respectively), the collar 48 and projection 52 separate (FIGS. 5-6) as the second frame portion 38 is moved with respect to the first frame portion 36. As such, the first aperture portion 54 and the second aperture portion 56 are separated (e.g., are not coaxial) in the intermediate and stowed positions.

The cross auger 34 may also be formed from first, second, and third auger portions (not shown) that align in the deployed position and separate in the stowed position.

A first frame actuator 60 moves the first and second frame portions 36, 38 with respect to each other. The first frame actuator 60 may include a cylinder 61, such as a hydraulic cylinder, and a piston 62. In other implementations, other types of actuators may be employed, such as pneumatic, electric (e.g., a linear actuator), etc. Similarly a second frame actuator 63 is symmetrical to the first frame actuator 60 and is disposed adjacent the third frame portion 40. The second frame actuator 63 may be the same type of actuator as the first frame actuator 60 and operates in a mirror image to the first frame actuator 60 described above.

With reference to FIGS. 1-2, the plurality of crop dividers 28 includes a plurality of stationary crop dividers 64, a first movable crop divider 66, and a second movable crop divider 68. The first movable crop divider 66 may be disposed proximate the first end 42 of the first frame portion 36, and the second movable crop divider 68 may be disposed proximate the second end 44 of the first frame portion 36. In other implementations, the plurality of crop dividers 28 may include one, three, or more movable crop dividers and may be disposed in other locations. The first and second movable crop dividers 66, 68 are disposed and operate as mirror images of each other. As such, only the first movable crop divider 66 need be described herein (and may be referred to as the movable crop divider). It should be understood that all of the description of the (first) movable crop divider 66 applies to the second movable crop divider 68, which includes the same structure and operation.

The movable crop divider 66 is movable between first and second positions, such as a lowered position (illustrated in FIG. 1) and a lifted position (illustrated in FIGS. 2 and 6). FIG. 6 schematically illustrates movement of the movable crop divider 66 between the lifted and lowered positions. The movable crop divider 66 has a lift axis B (FIGS. 5-6) fixed with respect to the first frame portion 36 and rotates or pivots about the lift axis B between the lowered and lifted positions. In the lowered position, the movable crop divider 66 is disposed generally horizontally, parallel with the first frame portion 36. In the lifted position, the movable crop divider 66 is raised to an angle α (FIG. 6) with respect to the first frame portion 36 (e.g., with respect to a horizontal reference H). The angle α is about 25 degrees (+/−5 degrees), and may generally be between 15 and 35 degrees, and more generally between 5 and 45 degrees. In other implementations, the angle α may have any other desired value. In other implementations, the movable crop divider 66 may be movable in other ways (e.g., lifted and/or slid and/or translated and/or rotated about a vertical axis) between different types of positions (angled or horizontal or other orientations that differ from the plurality of stationary crop dividers 64).

FIG. 6 schematically illustrates movement of the movable crop divider 66 with respect to the first frame portion 36 by way of a linkage 70. As shown in FIG. 6, the movable crop divider 66 is lifted about the lift axis B from the horizontal reference H, which is parallel with the plurality of crop dividers 28 that are not movable, to the lifted position at the angle α with respect to the horizontal reference H.

FIG. 6 also schematically illustrates movement of the second frame portion 38 with respect to the first frame portion 36 along a dashed line 72. The intermediate position is illustrated in solid lines, and the stowed position is illustrated in dash-dot lines. As illustrated with the dashed line 72, the projection 52 is receivable in the receptacle 50 of the collar 48 with the first and second aperture portions 54, 56 coaxially aligned in the deployed position along the locking axis A.

Figure 7:
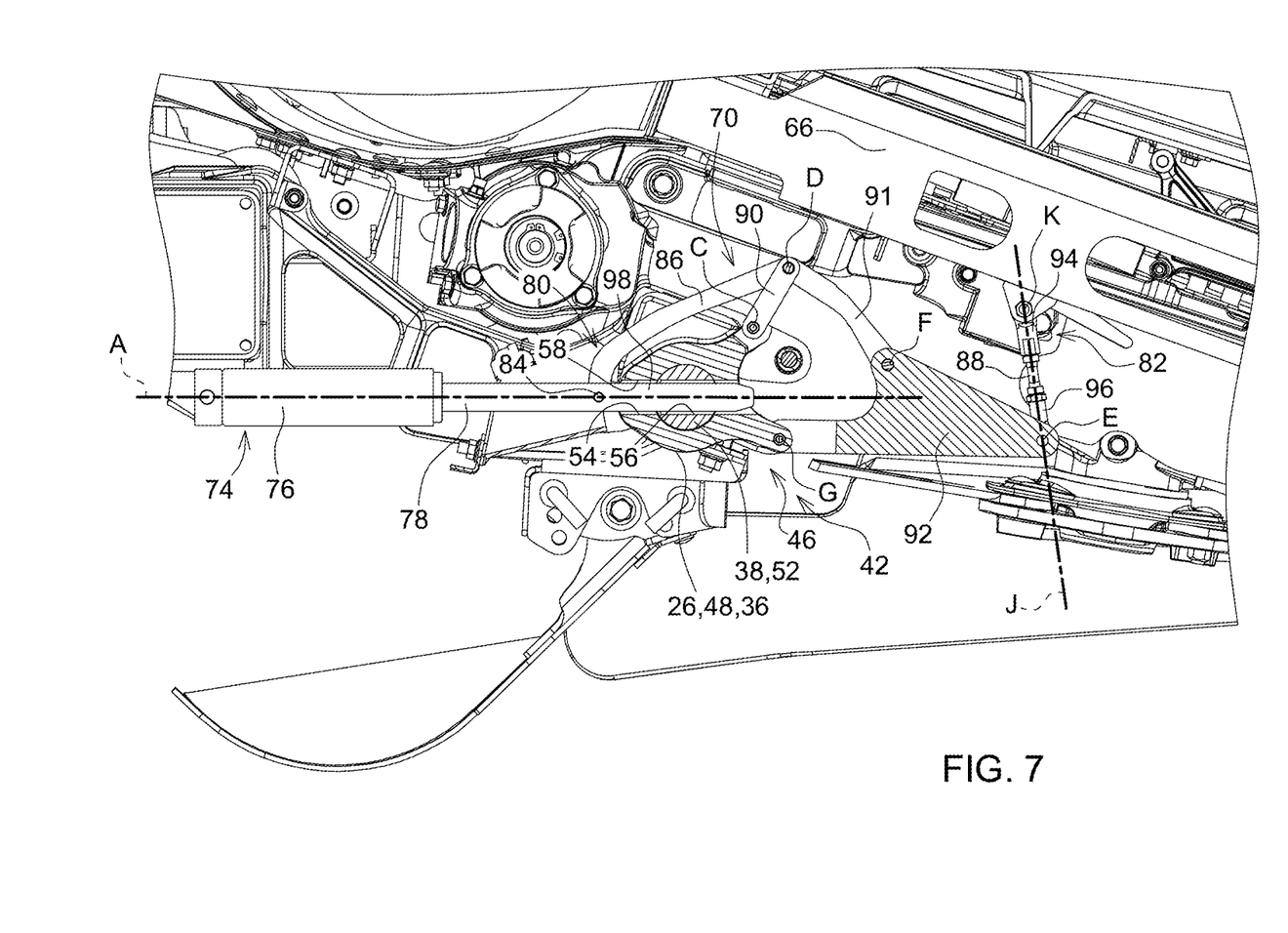
FIG. 7 is a side cross-sectional view, taken through the lock axis shown in FIG. 5 with the frame in the deployed position, of a portion of the folding corn head with a hydraulic actuator in a first position for lowering the movable crop divider and locking the frame.
Figure 8:
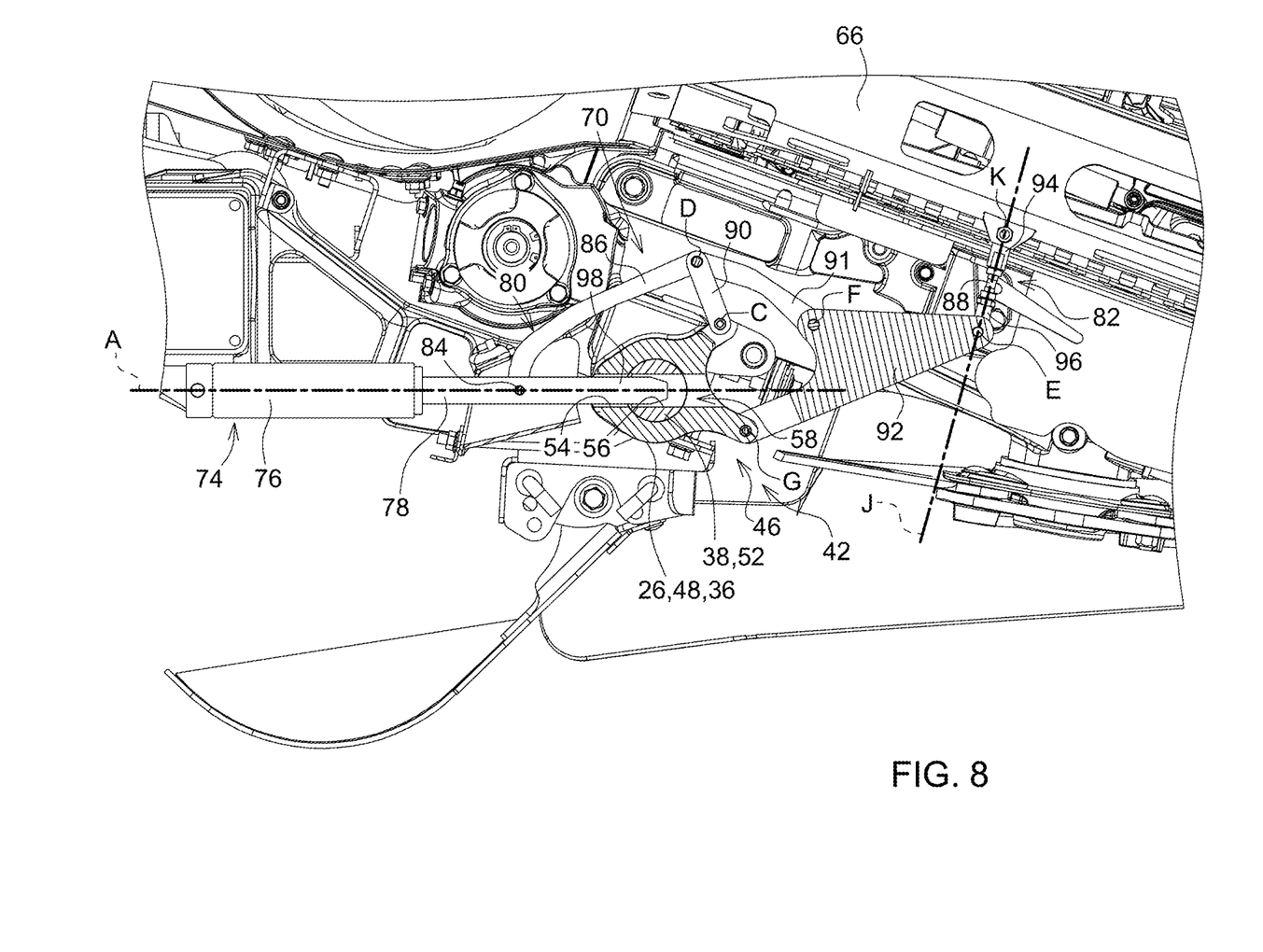
FIG. 8 is a side cross-sectional view, taken through the lock axis shown in FIG. 5 with the frame in the deployed position, of a portion of the folding corn head with the hydraulic actuator in an intermediate position.
Figure 9:
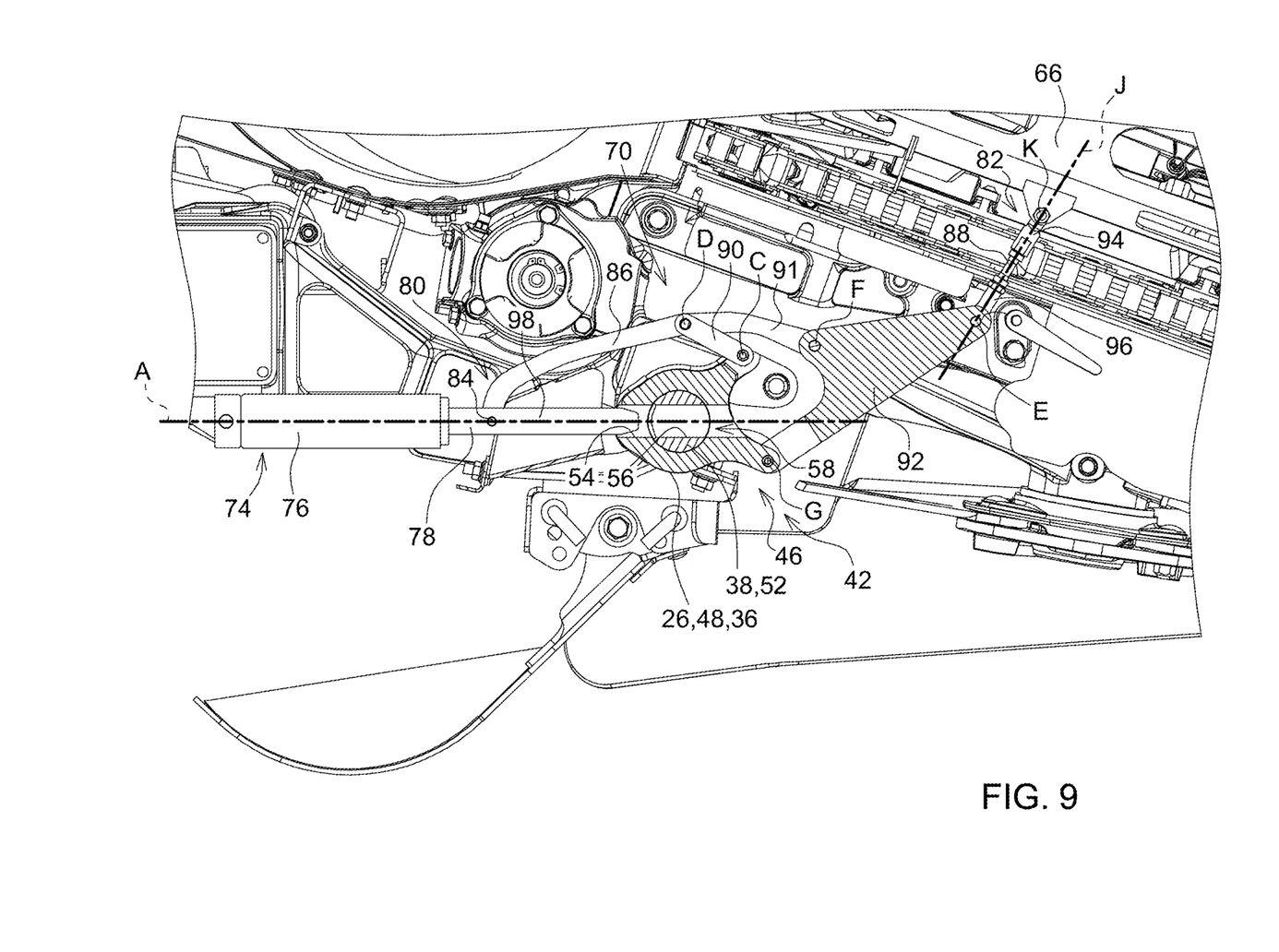
FIG. 9 is a side cross-sectional view, taken through the lock axis shown in FIG. 5 with the frame in the deployed position, of a portion of the folding corn head with the hydraulic actuator in a second position for lifting the movable crop divider and unlocking the frame.

FIGS. 7-9 are cross-sectional side views of a portion of the crop head 14 taken through the locking axis A with the frame 26 in the deployed position. In the deployed position, the projection 52 is received in the receptacle 50 with the first and second aperture portions 54, 56 aligned coaxially along the locking axis A.

As shown in FIGS. 7-9, an actuator 74 is aligned coaxially with the locking axis A and is supported by the first frame portion 36, e.g., fixed to the first frame portion 36. In the illustrated implementation, the actuator 74 includes a cylinder 76 and a piston 78 coaxially disposed (or aligned) with the locking axis A, the piston 78 being extendable and retractable along the locking axis A with respect to the cylinder 76. The actuator 74 may be a hydraulic actuator. In other implementations, other types of actuators may be employed, such as pneumatic actuators, electric actuators (e.g., linear actuators), and the like, having a piston movable coaxially along the locking axis A.

As shown in FIG. 7, the piston 78 is extended away from the cylinder 76 into an extended position. In the extended position, the piston 78 engages the first and second frame portions 36, 38 (with the first and second frame portions 36, 38 in the deployed position) to lock the first and second frame portions 36, 38 with respect to each other. Specifically, the piston 78 extends into the lock 46 along the locking axis A to lock the first and second frame portions 36, 38 with respect to each other. Even more specifically, the piston 78 extends into the first and second aperture portions 54, 56 (i.e., into the aperture 58) along the locking axis A to lock the first and second frame portions 36, 38 with respect to each other. Even more specifically, the piston 78 extends into the projection 52 and the collar 48 to lock the first and second frame portions 36, 38 with respect to each other. In the illustrated implementation, the piston 78 extends through the projection 52 and the collar 48. However, in other implementations, the piston 78 need only extend into the lock 46 and need not extend all the way through. Thus, the frame 26 is locked in the deployed position (FIG. 1) for performing a harvesting operation. No linkage is disposed between the piston 78 and the lock 46 to perform the locking operation. The piston 78 directly engages the lock 46 (e.g., directly engages the first and second frame portions 36, 38) to lock the frame 26 without the use of a linkage between the piston 78 and the lock 46.

FIG. 7 illustrates the linkage 70 operatively coupled between the piston 78 and the movable crop divider 66. A first end 80 of the linkage 70 is pivotably coupled to the piston 78 at a pivot 84, and a second end 82 of the linkage 70 is pivotably coupled to the movable crop divider 66. The linkage 70 is also pivotably coupled to the first frame portion 36 intermediate the first and second ends 80, 82. The pivot 84 translates axially along the locking axis A with movement of the piston 78.

Specifically, the linkage 70 includes a first link 86 pivotably coupled to the piston 78 at the pivot 84, a second link 88 pivotably coupled to the movable crop divider 66, a first intermediate link 90 pivotably coupled to the first link 86 and to the first frame portion 36, a second intermediate link 91, a third intermediate link 92 pivotably coupled to the second link 88, pivotably coupled to the first frame portion 36, and pivotably coupled to the second intermediate link 91. The first intermediate link 90 is coupled to the first frame portion 36 at a first fixed pivot axis C that remains stationary with respect to the first frame portion 36 during articulation of the linkage 70. The first intermediate link 90 is also coupled to the first link 86 at a first movable pivot axis D. The second intermediate link 91 is also pivotably coupled to the first intermediate link 90 and to the first link 86 at the first movable pivot axis D. The third intermediate link 92 is coupled to the second link 88 at a second movable pivot axis E, is coupled to the second intermediate link 91 at a third movable pivot axis F, and is coupled to the first frame portion 36 at a second fixed pivot axis G that remains stationary with respect to the first frame portion 36 during articulation of the linkage 70.

The second link 88 may include a first link portion 94 rotatably coupled to a second link portion 96. The first and second link portions 94, 96 are disposed along a longitudinal axis J of the second link 88. The first and second link portions 94, 96 are rotatable about the longitudinal axis J of the second link 88 such that the first link portion 94 is rotatable with respect to the second link portion 96. The first and second link portions 94, 96 may also telescope, or extend and retract, with respect to each other to provide variable length of the second link 88 along the longitudinal axis J. The first link portion 94 may be pivotably coupled to the movable crop divider 66 at a fourth movable pivot axis K, and the second link portion 96 may be pivotably coupled to the third intermediate link 92 at the second movable pivot axis E. Each of the links 86, 90, 91, 92 is a rigid body, except the second link 88 which has rotatable and extendable portions 94, 96 as described above. In other implementations, the linkage 70 may include other arrangements of links and other types of links.

The linkage 70 transfers, and converts, motion of the piston 78 into motion of the movable crop divider 66 such that the piston 78 is operable to move the movable crop divider 66 by way of the linkage 70. Specifically, the linkage 70 transfers translating motion of the piston 78 along the locking axis A to pivoting movement of the movable crop divider 66 about the lift axis B. The linkage 70 transfers motion of the piston 78 into motion of the movable crop divider 66 between the lifted position and the lowered position.

The piston 78 includes a distal end portion 98 extending from the pivot 84 away from the cylinder 76, coaxially with the cylinder 76 and the lock axis A. The distal end portion 98 of the piston 78 locks the first and second frame portions 36, 38 with respect to each other when the piston 78 is in the extended position, as described above.

In operation, the piston 78 extends along the lock axis A to lock and unlock the frame 26 and to lower and lift the movable crop divider 66. With the frame 26 in the deployed position (FIG. 1), and with the piston 78 extended to the extended position, as illustrated in FIG. 7, the movable crop divider is in the lowered position (FIG. 1) and the frame 26 is locked. Thus, the crop head 14 is in a harvesting state in which the frame 26 is deployed and locked, with the movable crop divider 66 lowered, such that the crop head 14 is ready to perform a harvesting operation. The piston 78 engages the first and second frame portions 36, 38 to inhibit movement of the second frame portion 38 with respect to the first frame portion 36. If the first frame actuator 60 were to be actuated with the frame 26 locked, the piston 78 interferes to inhibit, or block, relative movement between the first and second frame portions 36, 38, thus the first and second frame portions 36, 38 are locked. The piston 78 also interferes to inhibit, or block, relative movement between the first and second frame portions 36, 38 during operation, e.g., during a harvesting operation as the harvester 10 moves or bounces along the support surface 30, which may be uneven. Thus, the piston 78 generally resists forces acting to move the first and second frame portions 36, 38 with respect to each other.

When folding the crop head 14 is desired, the piston 78 is moved from the extended position to the retracted position. FIG. 8 illustrates the piston 78 between the extended and the retracted positions.

FIG. 9 illustrates the piston 78 in the retracted position. When the piston 78 is retracted to the retracted position, the movable crop divider 66 is in the lifted position and the frame 26 is unlocked. The linkage 70 moves with the piston 78 as the piston 78 retracts to lift the movable crop divider 66. The piston 78 (specifically, the distal end portion 98 of the piston 78) simultaneously retracts from the lock 46 (e.g., from the projection 52 and collar 48) to disengage from the first and second frame portions 36, 38 and unlock the frame 26. Thus, the crop head 14 is in a transport state in which the frame 26 is unlocked and capable of moving (or allowed to move) freely between the deployed and stowed positions (i.e., uninhibited), and the movable crop divider 66 is lifted. The movable crop divider 66 is lifted to make room for the second frame portion 38 to be moved to the stowed position. With the frame 26 unlocked, the first frame actuator 60 is allowed to move the frame 26 freely between the deployed and stowed positions without interference from the piston 78.

Thus, the first and second frame portions 36, 38 are lockable with respect to each other to inhibit folding and unlockable with respect to each other to allow folding.

The first and third frame portions 36, 40 are lockable and unlockable in the same way as the first and second frame portions 36, 38 described above. The first and third frame portions 36, 40 are also movable with respect to each other in the same way as the first and second frame portions 36, 38 described above. Similarly, the second movable crop divider 68 is lifted and lowered in the same way as the first movable crop divider 66 described above.

Thus, the disclosure provides a single-actuator, dual function mechanism for lifting/lowering the movable crop divider 66 and locking/unlocking the frame 26. Various features and advantages of the disclosure are set forth in the following claims.

What is claimed is:

1. A crop head for a harvester, the crop head comprising:
    a folding frame having at least a first frame portion and a second frame portion, wherein the first and second frame portions are configured to be folded with respect to each other in a transport state and unfolded with respect to each other in a harvesting state, wherein the first and second frame portions are lockable with respect to each other to inhibit folding and unlockable with respect to each other to allow folding;
    a plurality of crop dividers supported by the first frame portion, wherein the plurality of crop dividers includes at least one movable crop divider that is movable with respect to the first frame portion between a first position and a second position; and
    a cylinder and a piston movable with respect to the cylinder between an extended position and a retracted position,
    wherein the piston is operable to move the movable crop divider between the first and second positions, and wherein the piston is configured to directly engage the first and second frame portions to lock the first and second frame portions with respect to each other.

2. The crop head of claim 1, further comprising a linkage operatively coupled between the piston and the movable crop divider, wherein the linkage is pivotably coupled to the piston at a pivot, wherein the piston includes a distal end portion extending from the pivot away from the cylinder, and wherein the distal end portion is configured to directly engage the first and second frame portions to lock the first and second frame portions with respect to each other.

3. The crop head of claim 2, wherein the distal end portion is configured to be received in an aperture extending into the first and second frame portions.

4. The crop head of claim 2, wherein the linkage includes a first link pivotably coupled to the piston at the pivot and a second link pivotably coupled to the first frame portion.

5. The crop head of claim 1, wherein the first position is lowered with respect to the first frame portion and the second position is lifted with respect to the first frame portion.

6. The crop head of claim 1, wherein the piston is movable into and out of an aperture in at least one of the first or second frame portions to lock and unlock the first and second frame portions with respect to each other.

7. The crop head of claim 1, wherein one of the first or second frame portions includes a projection and the other of the first or second frame portions includes a receptacle configured to receive the projection, wherein the piston is configured to lock the projection in the receptacle.

8. The crop head of claim 7, wherein an aperture is disposed in the projection, and wherein the piston is received in the aperture in the extended position to lock the first and second frame portions with respect to each other.

9. The crop head of claim 1, further comprising an actuator configured to move the first and second frame portions with respect to each other.

10. The crop head of claim 1, wherein the first and second frame portions align in the harvesting state to define a lock having a locking axis, wherein the piston is disposed coaxially with the locking axis.

11. The crop head of claim 1, further comprising a second plurality of crop dividers supported by the second frame portion.

12. A crop head for a harvester, the crop head comprising:
a folding frame having at least a first frame portion and a second frame portion, wherein the first and second frame portions are lockable with respect to each other to inhibit folding in a harvesting state and unlockable with respect to each other to allow folding in a transport state, wherein the first and second frame portions are configured to be aligned in the harvesting state to define a lock having a locking axis extending through the first and second frame portions;
a plurality of crop dividers supported by the first frame portion, wherein the plurality of crop dividers includes at least one movable crop divider that is movable with respect to the first frame portion between a first position and a second position; and
a cylinder and a piston movable with respect to the cylinder between an extended position and a retracted position,
wherein the piston is operable to move the movable crop divider between the first and second positions, and
wherein the piston is disposed coaxially with the locking axis.

13. The crop head of claim 12, wherein the lock includes an aperture extending into the first and second frame portions along the locking axis, wherein the piston is configured to be received in the aperture.

14. The crop head of claim 12, wherein one of the first and second frame portions includes a collar and the other of the first and second frame portions includes a projection, wherein the collar is configured to receive the projection in the harvesting state, wherein the lock includes an aperture extending into the collar and the projection.

15. The crop head of claim 14, wherein the piston is extendable into the aperture.

16. The crop head of claim 12, wherein the piston is operable to move the movable crop divider by way of a linkage coupled to the piston, wherein the linkage is coupled to the piston at a pivot, and wherein the piston includes a distal end portion extending from the pivot to be received in the lock.

17. A crop head for a harvester, the crop head comprising:
a folding frame having at least a first frame portion and a second frame portion, wherein the first and second frame portions are lockable with respect to each other to inhibit folding in a harvesting state and unlockable with respect to each other to allow folding in a transport state, wherein the first and second frame portions are configured to be aligned in the harvesting state to define a lock having a locking axis extending through the first and second frame portions;
a plurality of crop dividers supported by the first frame portion, wherein the plurality of crop dividers includes at least one movable crop divider that is movable with respect to the first frame portion between a first position and a second position; and
an actuator having a piston and a cylinder, wherein the piston is movable with respect to the cylinder between an extended position and a retracted position,
wherein the piston is operable to move the movable crop divider between the first and second positions, and
wherein the piston is configured to lock and unlock the first and second frame portions with respect to each other without the use of a linkage between the piston and the lock.

18. The crop head of claim 17, further comprising a linkage configured between the piston and the movable crop divider for converting motion of the piston into motion of the movable crop divider.

19. The crop head of claim 18, wherein the linkage is coupled to the piston at a pivot, and wherein the piston includes a distal end portion extending from the pivot coaxially with respect to the cylinder, wherein the distal end portion is configured to engage the first and second frame portions to lock the first and second frame portions with respect to each other.

20. The crop head of claim 17, wherein the piston is disposed coaxially with the locking axis and is movable into and out of the lock.

* * * * *